(12) United States Patent
Hämäläinen et al.

(10) Patent No.: US 7,801,545 B2
(45) Date of Patent: Sep. 21, 2010

(54) POWER CONTROL METHOD OF DISCONTINUOUS TRANSMISSION

(75) Inventors: Seppo Hämäläinen, Espoo (FI); Antti Lappeteläinen, Espoo (FI)

(73) Assignee: Nokia Corporation, Espoo (FI)

( * ) Notice: Subject to any disclaimer, the term of this patent is extended or adjusted under 35 U.S.C. 154(b) by 1544 days.

(21) Appl. No.: 11/025,014

(22) Filed: Dec. 30, 2004

(65) Prior Publication Data
US 2005/0107108 A1    May 19, 2005

Related U.S. Application Data

(63) Continuation of application No. 09/155,231, filed on Sep. 23, 1998, now Pat. No. 7,263,077.

(51) Int. Cl.
*H04B 7/00* (2006.01)
(52) U.S. Cl. .................................. 455/522; 455/69
(58) Field of Classification Search ............... 455/69, 455/522; 370/335, 252, 311, 318, 342
See application file for complete search history.

(56) References Cited

U.S. PATENT DOCUMENTS

| | | | |
|---|---|---|---|
| 5,056,109 A * | 10/1991 | Gilhousen et al. ........... 370/342 |
| 5,383,219 A | 1/1995 | Wheatley, III et al. |
| 5,396,516 A * | 3/1995 | Padovani et al. ............ 375/225 |
| 5,450,616 A | 9/1995 | Rom |
| 5,537,410 A * | 7/1996 | Li ............................. 370/465 |
| 5,598,416 A | 1/1997 | Yamada et al. |
| 5,603,096 A * | 2/1997 | Gilhousen et al. ............. 455/69 |
| 5,604,766 A * | 2/1997 | Dohi et al. ................... 375/130 |
| 5,629,934 A | 5/1997 | Ghosh et al. |
| 5,745,480 A * | 4/1998 | Behtash et al. .............. 370/252 |

(Continued)

FOREIGN PATENT DOCUMENTS

EP    0645940 A1    3/1995

(Continued)

OTHER PUBLICATIONS

Japanese Office Action dated Feb. 10, 2010.

(Continued)

*Primary Examiner*—Quochien B Vuong
(74) *Attorney, Agent, or Firm*—Squire, Sanders & Dempsey, LLP

(57) ABSTRACT

According to the proposed method, the frequency of power control commands transmitted on a power control channel is changed according to the traffic. When the traffic becomes slower in at least one direction due to a DTX state, a slower transfer rate, asymmetric data transfer or for any other reason, the frequency of power control commands is lowered. Both the base station and the personal station may lower the frequency of the commands which they send. An alternative to changing the frequency of power control commands is to change the energy of power control bits. The duration of power control bits must hereby be extended, if a standard bit error ration is desired. If the system is frequency-divided and/or time-divided and uses frequency control command of several bits, the length of the command word may be shortened in addition to or as an alternative to the change in frequency. The power control algorithm may be changed several times during a traffic connection.

22 Claims, 5 Drawing Sheets

U.S. PATENT DOCUMENTS

| | | | | |
|---|---|---|---|---|
| 5,745,520 | A | * | 4/1998 | Love et al. .................. 375/130 |
| 5,757,850 | A | | 5/1998 | Takaki |
| 5,771,226 | A | | 6/1998 | Kaku |
| 5,805,585 | A | * | 9/1998 | Javitt et al. .................. 370/342 |
| 6,418,320 | B2 | * | 7/2002 | Yoshida et al. .............. 455/522 |
| 7,263,077 | B1 | * | 8/2007 | Hamalainen et al. ........ 370/311 |

FOREIGN PATENT DOCUMENTS

| | | |
|---|---|---|
| EP | 0 802 638 | 10/1997 |
| JP | 5-030022 | 2/1993 |
| JP | 5336061 | 12/1993 |
| JP | 787093 | 3/1995 |
| JP | 7231479 | 8/1995 |
| JP | 7-273722 | 10/1995 |
| JP | 832513 | 2/1996 |
| JP | 8130535 | 5/1996 |
| WO | 91/07037 | 5/1991 |
| WO | 96/03813 | 2/1996 |
| WO | 97/02668 | 1/1997 |

OTHER PUBLICATIONS

"Proposed CDMA PCCS Standard," Joint Technical Committee (JTC), Sep. 23, 1994.

Japanese Office Action dated Jun. 6, 2006.

* cited by examiner

POWER CONTROL METHOD OF DISCONTINUOUS TRANSMISSION

CROSS-REFERENCE TO RELATED APPLICATIONS

This application is a continuation of U.S. application Ser. No. 09/155,231, filed Sep. 23, 1998 now U.S. Pat. No. 7,263,077, the entire contents of which are incorporated herein by reference.

BACKGROUND OF THE INVENTION

1. Field of the Invention

This invention concerns a system where the transmission power between base station and personal station is controlled during radio communication. In particular, the invention concerns such a method for use in cellular networks by which power control commands are sent to the personal station and from the personal station to the base station.

2. Description of the Related Art

It must be possible in all cellular systems to control at least the transmission power of the personal station for its transmission to arrive at the base station with a sufficient signal-to-noise ratio irrespective of the distance between personal station and base station. Power transmission will be explained in the following using the CDMA system (Code Division Multiple Access) as an example. FIG. 1 shows a CDMA forward traffic channel. This comprises the following code canals: a pilot channel, one synchronization channel, from one to seven paging channels and no more than 61 traffic channels. The maximum number is when there is only one paging channel besides the synchronization channel. Each code channel is orthogonally hashed and thus spread out by using the phase quadrature couple of the random noise sequence. At the base station several forward traffic CDMA channels may be used by way of frequency-divided multiplexing. The structure shown in FIG. 1 is presented in Proposed CDMA FCS Standard, Joint Technical Committee (JTC), Sep. 23, 1994. This proposal is also known by the name IS-95. Reference will be made in the following to a CDMA system according to this standard, although the invention is suitable for any kind of system.

An unmodulated spread spectrum signal is sent continuously on the pilot channel and it is used for synchronization by the PS (Personal Stations).

An encoded, interleaved, spread and modulated spread spectrum signal is sent on the synchronization channel. The personal station uses this signal for achieving a preliminary time synchronization. The channel bit rate is 1200 bps and the frame duration is 26,666 ms. No sub-channel relaying power control commands must be included in the synchronization channel.

An encoded, interleaved, spread and modulated spread spectrum signal is sent on the paging channel. The data rate is 9600 or 4800 bps and the frame duration is 20 ms. The base station uses the paging channel for transmit overhead information and personal station specific information. The number of these channels may vary in one CDMA forward traffic channel, however, the maximum number is 7 channels.

The traffic channel is used for transmitting user and signaling information to the PS (Personal Station). The maximum number of simultaneous forward traffic channels supported by one CDMA traffic channel is 63 minus the number of call and synchronization channels operating on one and the same CDMA traffic channel.

The frame structure itself is the same both on the forward traffic channel and on the reverse traffic channel. The information is transmitted as frames, the length of which is 20 ms. The base station and the personal station may send information at a varying data rate. Data transfer rates when using rate set I are 9600, 4800, 2400 and 1200 bps respectively while the corresponding frame bit numbers at different rates are 192, 96, 48 and 24 bits respectively. When using rate set 2, data transfer rates are 14400, 7200, 3600 and 1800 bps respectively while the corresponding frame bit numbers are 288, 144, 72 and 36 bits. The frame bits are formed by information bits, frame quality indicator bits and encoder tail bits. The essential thing is that in both directions the structure of the traffic frame is different at different transfer rates, so when identifying the frame structure the transfer rate will also be known.

Such modulation symbols which are transferred at a lower data rate are also transmitted with a lower energy, but although the data rate varies from one frame to another, the symbol modulation rate is kept constant. When entering E3 energy per symbol and Eb energy per information bit, the following Table 1 according to the standard will apply:

TABLE 1

| Data rate | Energy per modulation symbol |
| --- | --- |
| 9600 | Es = Eb/2 |
| 4800 | Es = Eb/4 |
| 2400 | Es = Eb/8 |
| 1200 | Es = Eb/16 |
| 14400 | Es = Eb/4 |
| 7200 | Es = Eb/8 |
| 3600 | Es = Eb/16 |
| 1800 | Es = Eb/32 |

Each forward traffic channel contains a power control sub-channel, which is used for transmitting such power control commands to the personal station during the communication, in response to which the personal station will change its transmission power. The power control channel is described in item 3.1.3.1.8 of the specification proposal.

From its received personal station signal the base station calculates the signal power always with intervals of 1.25 ms, which time corresponds to 16 modulation symbols. Judging by the signal power the base station will command the personal station to increase or decrease the transmission power. Thus a big power control loop is formed, which comprises the personal station, the base station and the two-way radio channel in between. The base station may also control its own transmission power to correspond with the power measurement reports which it receives from the personal station. This is so because the personal station constantly keeps statistics on frame errors and sends the power measurement report regularly or when a certain threshold value is exceeded.

The power control sub-channel is formed in such a way that power control bits are sent constantly among the normal traffic channel bits. The power control bits are repeated cyclically at intervals of 1.25 ms. Hereby the bit rate of the power control channel is 800 bps. Bit 0 means that the personal station must increase its transmission power, and correspondingly bit I means a command to lower the transmission power. The bits are located in the frame so that from the completed traffic frame, which is a convolution coded and interleaved frame formed from modulation symbols, two successive modulation symbols are removed at regular intervals and they are replaced with a power control bit. Thus, the time width of one power control bit is 104.166 ms. The procedure is generally known in the field and it is called symbol puncturing. The puncturing figure shows which symbols are removed from the frame and replaced with power control bits. The power control bit is transmitted with energy Eb.

Having received the power control bit, the personal station will increase or decrease its transmission power in the direction indicated by the bit. The power control bit is considered genuine, if it was received in that 1.25 ms time slot, which is the second time slot counting from the time slot in which the personal station has transmitted. The change of power level is a small step, and the standard determines that one bit changes the power level by 1 dB. A great change of the power level will thus require transmission of several power control bits.

As is done in FDD/TDMA systems, DTX (Discontinuous Transmission) is also used in CDMA systems. In a broader sense, DTX also includes an asymmetric case where information is transferred in one direction only, while acknowledgements are transferred in the opposite direction. An Internet connection is an example of such a situation. Power control commands are sent to the receiving party at a normal frequency even if the party is sending information only occasionally.

It is possible to go over to the DTX state in different ways. Firstly, when the personal station discovers that the data transfer rate which it needs is dropping, it will first send to the base station information on the data rate to be used in the following radio frame and then from the next frame forward it will use the rate which it stated. Secondly, the personal station may change the transfer rate during the connection without further ado. The base station will learn the transfer rate from the frame structure, because, as was said above, when the frame structure is identified the used transfer rate will also be known, since the frame structure vanes at different transfer rates.

It is a problem in the presented CDMA system and also in other known CDMA systems that power control commands of one or several bits are always sent at the same standard frequency and energy. Power control is fast so that the transmission power will comply as closely as possible with changes in the radio path. In addition, power control commands are sent both in the forward direction and in the reverse direction at the same frequency and the power control will thus not be affected by the transfer rate used, by asymmetry of the data transfer or by the fact that either party may be in the DTX state. The outcome is, that in the DTX state and when using a reduced data transfer rate, the power control will use a disproportionately large share of the radio link's capacity.

It is thus an objective of the present invention to bring about a method of power control which adapts to the data transfer situation, releasing radio link capacity for other use in the DTX state and at a reduced data transfer rate.

The objective is achieved with the method defined in the independent claims.

BRIEF SUMMARY OF THE INVENTION

According to the proposed method, the frequency of power control commands to be sent on a power control channel is changed according to the traffic. When the traffic becomes slower at least in one direction, due to a DTX state, a lower transfer rate, asymmetric data transfer or any other reason, the frequency of power control commands is lowered. Both the base station and the personal station may lower the frequency of the commands they are sending. It is also possible to proceed so that the party with less need to transmit data or with no transmission at all will be sent power control commands only seldom, whereas this same party itself sends power control commands either at a normal frequency, if it receives information at a high rate, or at a lowered frequency, if the reception rate (the other party's transmission rate) is reduced.

An alternative to changing the frequency of power control commands is to change the energy of power control bits. If it is desirable to keep constant the bit error ratio of received power control bits, the duration of the power control bit must be extended, because the receiver must gather energy over a longer time to be able reliably to express the bit. If an increase of the bit error ratio is allowed in reception, the power control bit duration may be kept constant, even though its energy is reduced. It is an advantage of the latter case that no changes need be made in the receiver.

If the system is time-divided and a frequency control command of several bits is used therein, the length of the command word may be shortened in addition to or as an alternative to the change in frequency.

Since lowered power control will not comply so quickly with changing circumstances as power control, it may cause an error in the transmission power of the controlled transmitter. For this reason, any error caused by slower power control may be compensated for by increasing the size of power control steps to be bigger than the size of quick power control steps.

One embodiment of the present invention is a method of operating a base station to control transmission of power control commands in a digital radio link, said base station having a radio connection with a personal station. The method includes identifying an absence of data transmissions being received from said personal station. The method also includes determining a base station frequency of transmission of a base station power control command and a personal station frequency of transmission of a personal station power control command based on said absence of data transmissions. The method further includes negotiating with said personal station to change said personal station frequency of transmission of said personal station power control command. The method additionally includes transmitting said base station power control command to said personal station in accordance with said base station frequency of transmission.

Another embodiment of the present invention is a method of operating a base station to control transmission of power control commands in a digital radio link, said base station having a radio connection with a personal station. The method includes receiving a request from a personal station to change transmission between said personal station and said base station. The method also includes determining a base station frequency of transmission of a base station power control command and a personal station frequency of transmission of a personal station power control command based upon said request. The method further includes negotiating with said personal station to change said personal station frequency of transmission of said personal station power control command. The method additionally includes transmitting said base station power control command to said personal station in accordance with said base station frequency of transmission.

A further embodiment of the present invention is a method of operating a base station to control transmission of power control commands in a digital radio link, said base station having a radio connection with a personal station. The method includes receiving a request from said personal station to change transmission between said personal station and said base station. The method also includes determining a base station frequency of transmission of a base station power control command and a personal station frequency of transmission of a personal station power control command in response to said request. The method further includes sending said personal station frequency of transmission of said personal station power control command to said personal station. The method additionally includes transmitting said base station power control command to said personal station in accordance with said base station frequency of transmission.

An additional embodiment of the present invention is a base station for having a radio connection with a personal station and for controlling transmission of power control commands in a digital radio link. The base station is configured to identify an absence of data transmissions being received from said personal station. The base station is also configured to determine a base station frequency of transmission of a base station power control command and a personal station frequency of transmission of a personal station power control command based on said absence of data transmissions. The base station is further configured to negotiate with said personal station to change said personal station frequency of transmission of said personal station power control command. The base station is additionally configured to transmit said base station power control command to said personal station in accordance with said base station frequency of transmission.

Another embodiment of the present invention is a base station for having a radio connection with a personal station and for controlling transmission of power control commands in a digital radio link. The base station is configured to receive a request from said personal station to change transmission between said personal station and said base station. The base station is also configured to determine a base station frequency of transmission of a base station power control command and a personal station frequency of transmission of a personal station power control command based upon said request. The base station is further configured to negotiate with said personal station to change said personal station frequency of transmission of said personal station power control command. The base station is additionally configured to transmit said base station power control command to said personal station in accordance with said base station frequency of transmission.

A further embodiment of the present invention is a base station for having a radio connection with a personal station and for controlling transmission of power control commands in a digital radio link. The base station is configured to receive a request from said personal station to change transmission between said personal station and said base station. The base station is also configured to determine a base station frequency of transmission of a base station power control command and a personal station frequency of transmission of a personal station power control command in response to said request. The base station is further configured to send said personal station frequency of transmission of said personal station power control command to said personal station. The base station is additionally configured to transmit said base station power control command to said personal station in accordance with said base station frequency of transmission.

BRIEF DESCRIPTION OF THE DRAWINGS

The invention will be described in greater detail referring to the appended drawings, wherein.

DETAILED DESCRIPTION OF THE INVENTION

Figure 1:
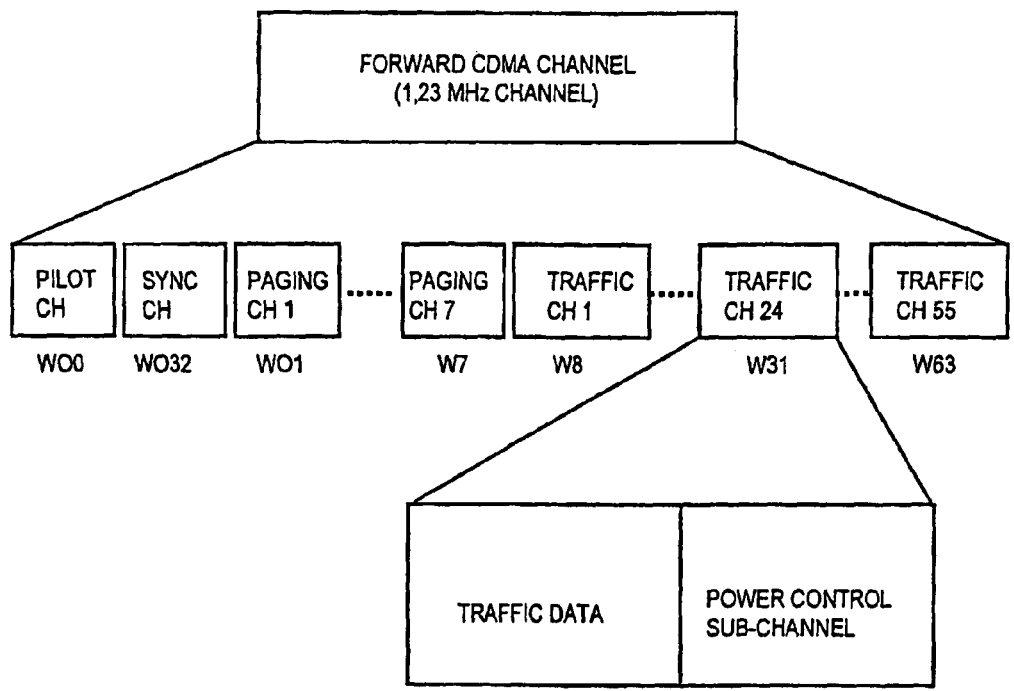
FIG. 1 shows radio channels in a CDMA system.
Figure 2:
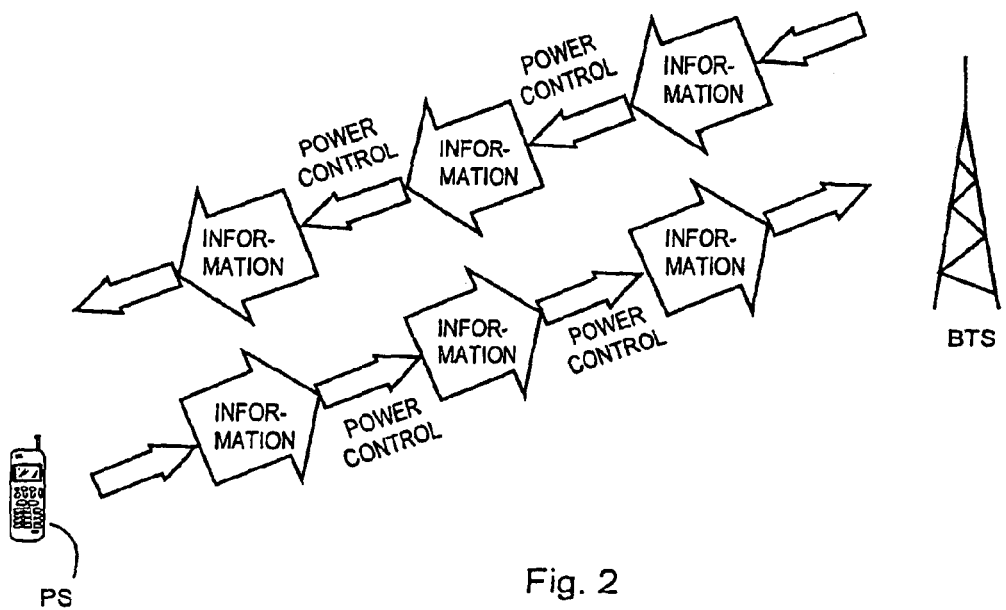
FIG. 2 illustrates known power control.

FIG. 2 shows a traffic connection between a personal station PS and a base transceiver station BTS in a CDMA system. As regards power control commands, data transfer is here in accordance with the known technology, so in the forward channel the base station sends power control commands among a stream of information bits at a standard frequency. For the sake of clarity, the information is here shown by big arrows while the power control commands are shown by small arrows. Correspondingly in the reverse channel, personal station PS sends power control commands among a stream of information bits at a standard frequency. As was explained earlier, in known systems power control commands are sent both on the reverse channel and on the forward channel at a standard frequency irrespective of the information transfer rate or whether any information at all is sent. But in the proposed method the frequency of those power control commands is reduced which are transmitted to the party which needs less transmission or which does not transmit at all.

Figure 3:
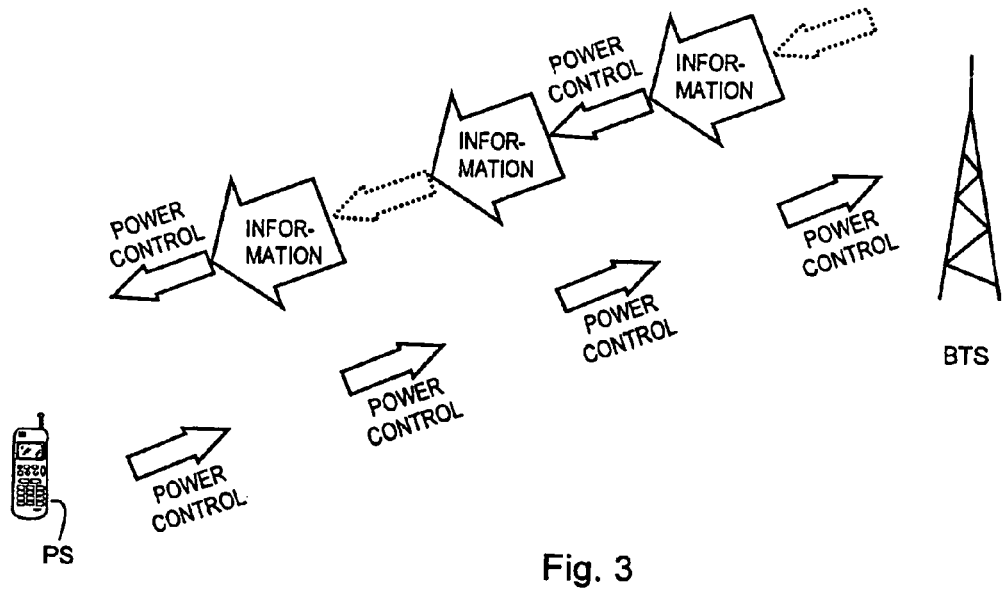
FIG. 3 shows power control with the reverse channel link in a DTX state.

FIG. 3 shows a case where base transceiver station BTS sends information to a personal station, but the personal station sends no information to the base transceiver station. The reverse channel is hereby in a DTX state. Its information rate is hereby low and the channel's transmission power requirement and, analogously, its reception power are low. Such a situation is very usual when the personal station is in an Internet connection, whereby the main information flow is from the network to the personal station. Since only little information is sent on the reverse channel as the personal station sends upper layer acknowledgements etc. only occasionally, there is no need for any quick control of the personal station's transmission power. For this reason, the frequency of power control commands to be sent to the personal station is reduced according to the invention. This is illustrated in the figures by leaving out every second power control command, whereby small arrows formed by dashed lines show the commands which have been left out. On the other hand, power control commands must be sent frequently on the reverse channel, e.g. at the normal frequency of the system, because the personal station must control the transmission of the base station which sends much information.

Figure 4:
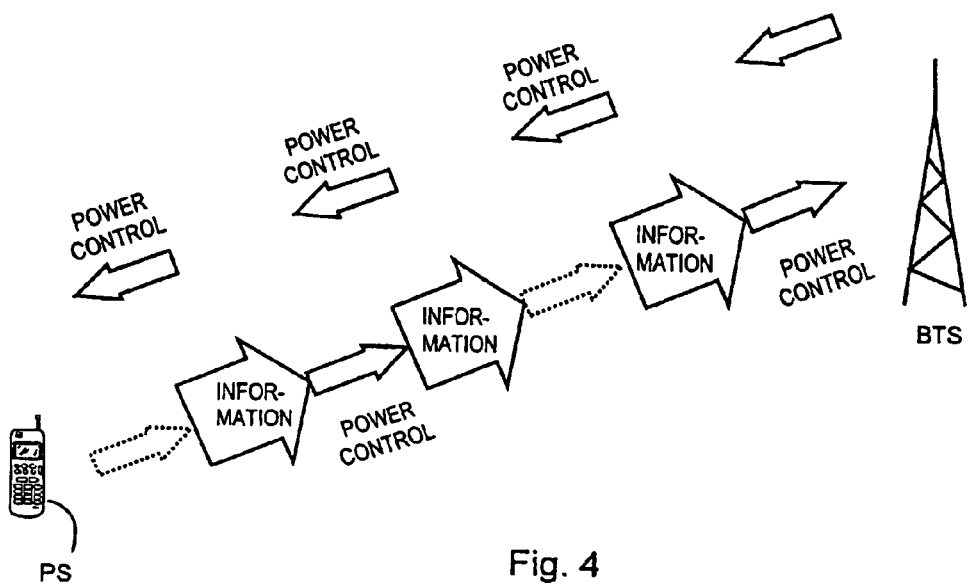
FIG. 4 shows power control with the forward channel link in a DTX state.

FIG. 4 shows a case where the personal station sends information to base transceiver station BTS, but the base station sends no information to the personal station. The forward channel is hereby in a DTX state. Such a situation is very usual when the personal station sends a fax or files towards the network. According to the invention, the frequency is now reduced as regards the power control commands to be sent on the reverse channel to the base station. This is illustrated in the figure by leaving out every second power control command, whereby the commands which have been left out are indicated by small arrows formed by dashed lines. On the other hand, power control commands are sent frequently on the forward channel e.g. at the system's normal frequency, because the base station must control the transmission of the personal station which is sending much information.

Figure 5:
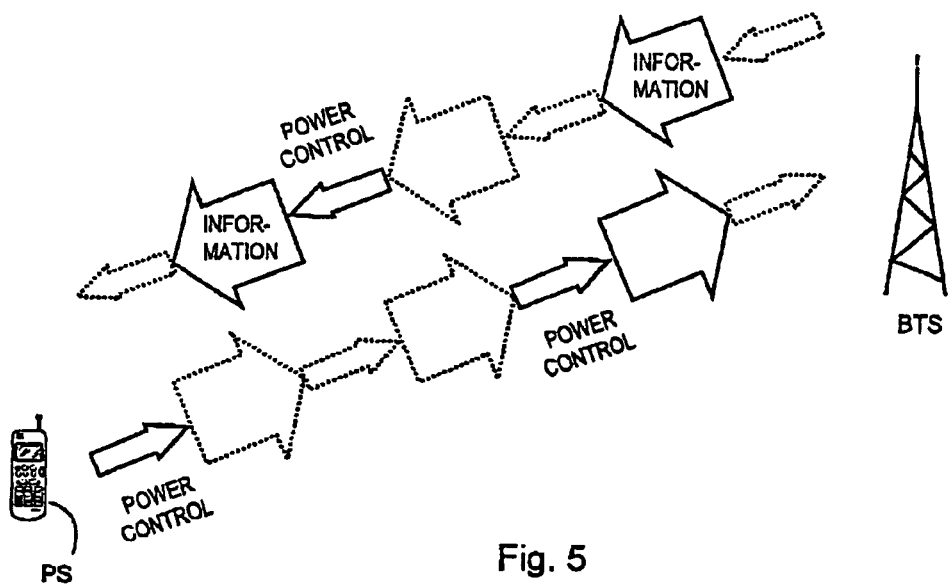
FIG. 5 shows power control in asymmetric transfer.

The cases illustrated above concern a case where the reverse channel or the forward channel is in a DTX state. The method can be used as well in a case where data transfer is asymmetric in such a way that there is transfer in both directions, but the rate is higher in one direction than in the other direction. The transmission frequency of power control commands is hereby also higher in that link where less information is sent. A case of this type is illustrated in FIG. 5. There less information is sent on the reverse channel than on the forward channel, so power control commands are sent at a higher frequency on the reverse channel than on the forward channel.

The method is also well suited for use in data transfer where the transfer rate will change in one direction or in both directions during the communication. The transmission frequency of power control commands sent in one direction is hereby controlled in proportion to the change in data transfer rate in the opposite direction.

Such cases were described above where resources of the radio channel are released by lowering the transmission frequency of power control commands. The same result is achieved also in alternative ways.

One alternative is to shorten the length of the command word in such systems where the command word is formed by several bits. Such systems are time-divided and/or frequency-divided systems.

Another alternative is to control the energy of the individual power control bit. When e.g. changing into a DTX state in one direction, the energy of power control bits to be sent in the opposite direction is lowered. If it is desirable to keep the bit error ratio of received power control bits constant, the duration of the power control bits must be extended, since the receiver must collect energy over a longer time to be able reliably to express the bit. Bit duration is extended by sending it in several parts. This alternative is especially advantageous in a system according to Proposed CDMA PCS Standard, Joint Technical Committee (JTC), since no changes need be made in the transmitter, but the necessary changes are limited to the power control algorithm. If an increase of the bit error ratio is allowed in reception, the duration of power control bits may be kept constant, even though its energy is reduced. This case has the advantage that no changes need be made in the receiver.

Figure 6:
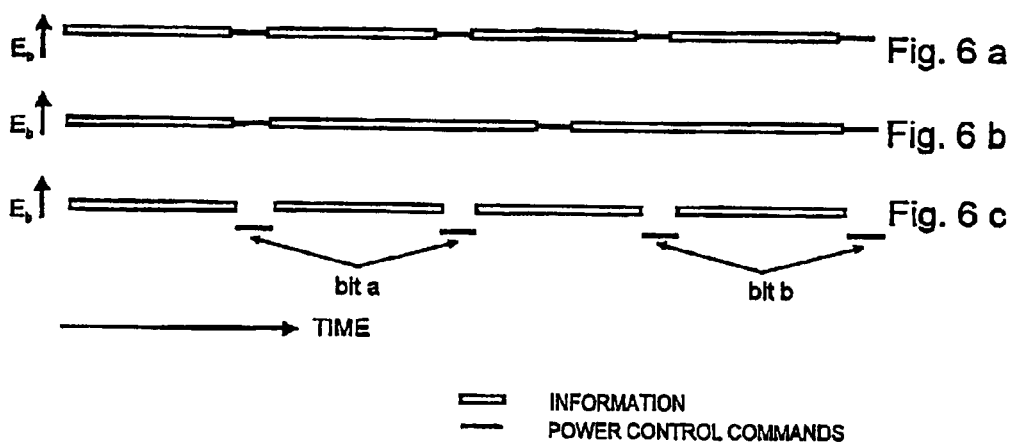
FIGS. 6a-6b show transmission energy as a function of time in different cases.

FIGS. 6a-6c illustrate ways of implementation of the proposed method. These illustrate transmission energy as a function of time. FIG. 6a shows a state-of-the-art method where power control commands are sent at a standard frequency in a flow of information and with the same energy Eb with which information symbols are transmitted.

FIG. 6b shows an embodiment of the method according to the invention where the transmission frequency of power control commands has been lowered, but their transmission energy Eb is the same as with the information.

FIG. 6c shows an embodiment where the energy of power control bits has been reduced to be lower than the transmission energy Eb of information symbols. The duration of power control bits is hereby extended by sending the bit, e.g. bit a, in two parts. One power control bit is hereby received during a longer time, so the receiver will thus be able reliably to express the power control bit.

Figure 7:
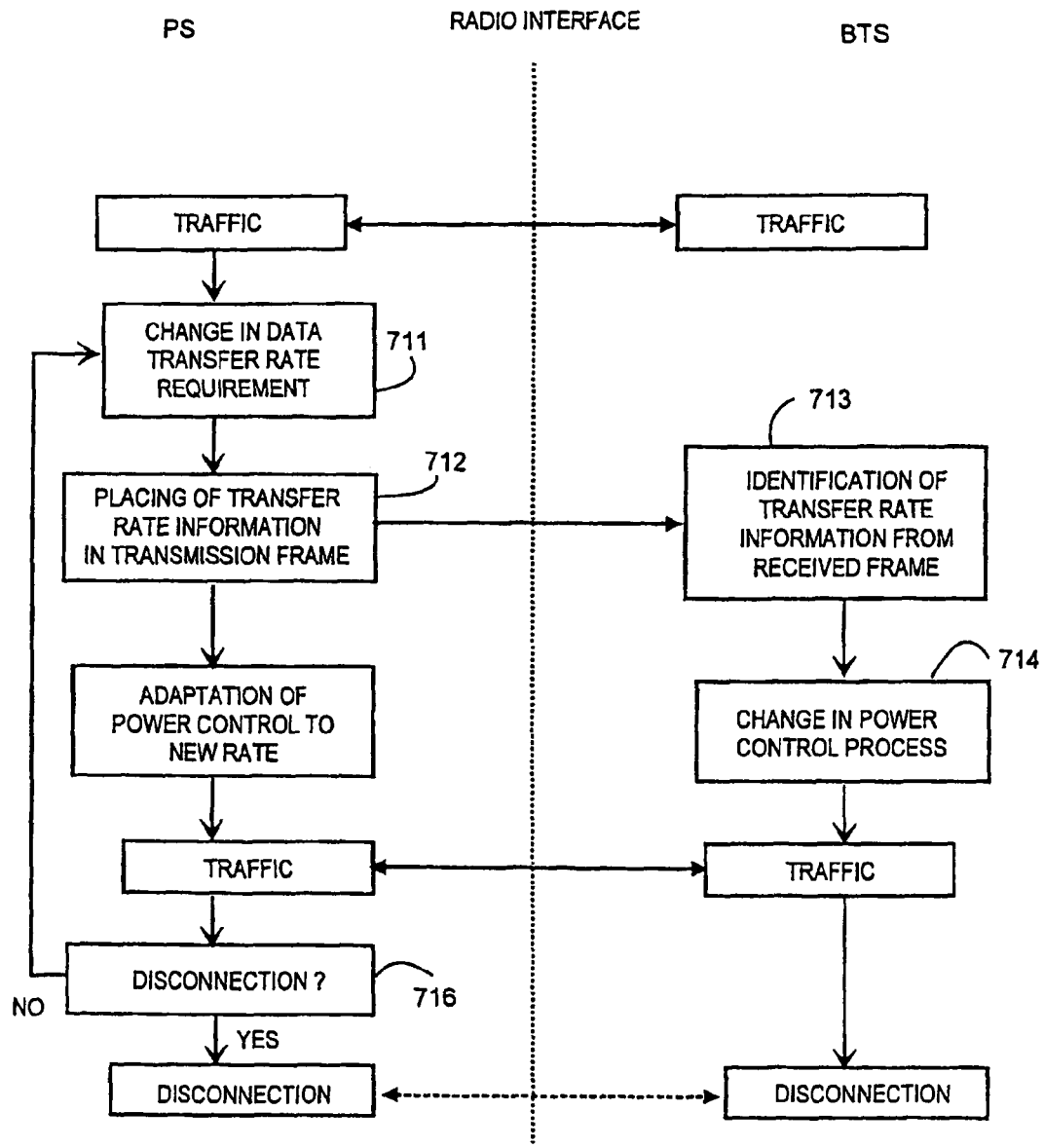
FIG. 7 is a block diagram of a possible embodiment.

FIG. 7 shows a block diagram of some possible events in personal station PS and in base transceiver station BTS. It is assumed that PS and BTS are first in communication using normal, that is quick power control. When personal station PS notices that its required data transfer rate is falling, step 711, it places in the traffic frame information on the lower data transfer rate it requires and sends the frame over the radio interface to base station BTS, step 712. The information may concern e.g. only the transmission of the personal station, that is, the reverse channel, its reception, that is, the forward channel, or the information may concern both directions. Thus the information may tell that nothing will be sent on the reverse channel for the time being, whereby the personal station is in a DTX state on this channel.

The base station separates the information on the new transfer rate from the frame it has received, step 713, and changes its power control process in accordance with the changed transfer rate, step 714. In the case of a DTX state on the reverse channel it would transmit power control commands scarcely, with reduced energy or it would shorten the length of the command word. Before this, the personal station has adapted its own power control to comply with the changed data transfer rate, so it is able correctly to pick up power control commands from the frames it receives. Likewise, it is able to transmit power control commands to the base station in the manner according to the invention which complies with the transmission rate of the base station.

The data transfer rate may remain the same until the end of the communication or it may be changed again, step 716. The latter case means returning to step 711 from which progress is as described. It is thus possible again to begin using a normal data transfer rate or any other lowered rate or to disconnect. A dashed line shows signaling between PS and BTS which may be required when disconnecting.

Figure 8:
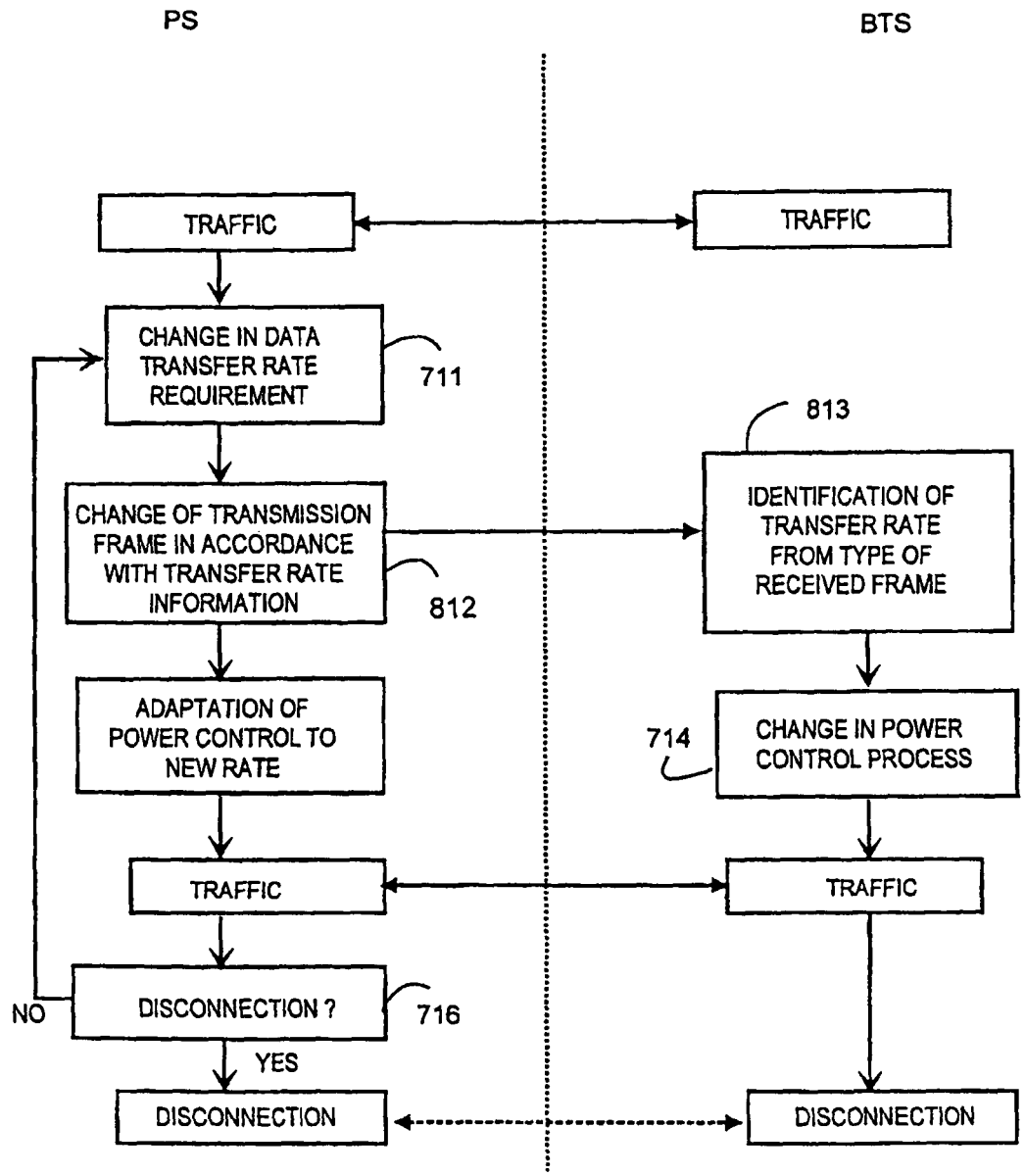
FIG. 8 is a block diagram of the embodiment.

FIG. 8 shows the same main features as FIG. 7, but adapted to a system according to standard proposal IS-95. The difference is that since according to this standard the structure of the traffic frame is different at different transfer rates, the personal station need not separately notify of the changed transfer rate. Without further ado, it begins using a frame structure in accordance with the new transfer rate, step 812. From the received frame structure the base station identifies the new transfer rate, step 813, and changes its power control to be in accordance with the invention, step 714. The personal station has also changed its own power control, step 714, so the operation may continue using the method according to the invention. During the communication the power control may again be changed or this changed power control may be used until disconnection, as was described in connection with FIG. 7.

It was proposed in connection with FIGS. 7 and 8 that the personal station originates the change, but the base station may be the originator as well and it may inform the personal station of the new rates, whereby both will change their power control algorithms according to the new situation. It is also possible that the personal station and the network negotiate before the operation begins or that they agree on rates during the operation and having reached an agreement they will set their power control algorithms accordingly.

When the frequency or energy of power control commands is calculated in accordance with the proposed method, the requirement of the link Eb/NO (energy of received signal/energy of noise) will grow compared to a case where power control commands are sent at a high frequency. This is so because a slower power control is not able to follow all signal changes. However, the increase in the Eb/NO requirement is very small and the system may be dimensioned so that despite the said increase a total benefit is achieved. It should also be noted that since the reception power required by the DTX connection is significantly smaller than the reception power of active users, minor errors caused by slower power control are not significant. Besides, errors can be compensated for by increasing the change of the transmitter power step which is caused by the power control command.

The proposed method can be embodied in many ways keeping within the definitions of the claims. For example, it is possible that only the base station changes the power control frequency or the energy of the power control bits which it sends while the personal station always functions in the same way. The invention can then be easily embodied in an IS-95 system. Some personal stations may be equipped with characteristics according to the invention and those which have quick power control according to the specification will operate in a normal manner even though power control commands arrive at a lower frequency. The personal stations simply note that e.g. every second power control command does not arrive.

In some cases the power control frequency or the energy of power control bits may be changed in reverse proportion to the load in the opposite transfer direction. For example, if at some moment most operation takes place on the forward channel, that is, from base station to personal station, and there is only slight traffic on the reverse channel, the power control frequency on the reverse channel can be kept low. The situation is such e.g. if five personal stations receive information from the network at the same time while only one transmits in the direction of the network.

The invention claimed is:

1. A method of controlling the transmission power used in a digital radio link in a system where a base station and a personal station are parties to a radio connection and during operation between the base station and the personal station, either party sends a power control command, which changes the transmission power of the other party, the method comprising:
   identifying a change in data transfer of the first party by the second party; and
   in response to the change in the data transfer, changing a manner in which the power control commands are to be sent to the first party by the second party to be in accordance with the data transfer,
   where when the data transfer relates to a decreased transmission rate of the first party, the second party lowers an energy of power control commands to be sent to the first party and, correspondingly, when the data transfer relates to an increased transmission rate of the first party, the second party increases the energy of power control commands.

2. The method as defined in claim 1, wherein the change in the data transfer of the first party is declared in a field of a transmission frame reserved for this purpose.

3. The method as defined in claim 1, wherein the change in the data transfer of the first party is declared by changing a structure of a transmission frame directly to correspond with the data transfer.

4. The method as defined in claim 1, wherein when the Manner in which the power control commands are to be sent changes, a size of a power control step of a transmitter is also changed.

5. A base station for operation in a digital radio link in a system where a base station and a personal station are parties to a radio connection and during operation the base station is configured to control the transmission power of the personal station by sending a power control command, wherein the base station is configured to:
   identify a change in data transfer of the personal station and change, in response to the change in the data transfer, the manner in which the power control commands are to be sent to the personal station to be in accordance with the data transfer,
   wherein when the data transfer relates to a decreased transmission rate of the personal station, the base station is configured to lower an energy of power control commands to be sent to the personal station and, correspondingly, when the data transfer relates to an increased transmission rate of the personal station, the base station is configured to increase the energy of power control commands.

6. A personal station for operation in a digital radio link in a system where a base station and a personal station are parties to a radio connection and during operation the personal station is configured to control the transmission power of the base station by sending a power control command, wherein the personal station is configured to:
   identify a change in data transfer of the base station and change, in response to the change in the data transfer, the manner in which the power control commands are to be sent to the base station to be in accordance with the data transfer,
   wherein when the data transfer relates to a decreased transmission rate of the base station, the personal station is configured to lower an energy of power control commands to be sent to the base station and, correspondingly, when the data transfer relates to an increased transmission rate of the base station, the personal station is configured to increase the energy of power control commands.

7. A method, comprising:
   identifying a change in a data transfer of a first party by the second party, wherein either the first party is a base station and the second part is a personal station connected to the base station or the first party is the personal station and the second party is the base station; and
   in response to the change in the data transfer, changing a manner in which the power control commands are to be sent to the first party by the second party to be in accordance with the data transfer,
   wherein when the data transfer relates to a decreased transmission rate of the first party, the second party lowers an energy of power control commands to be sent to the first party and, correspondingly, when the data transfer relates to an increased transmission rate of the first party, the second party increases the energy of power control commands.

8. The method of claim 7, wherein the change in the data transfer of the first party is declared in a field of a transmission frame reserved for this purpose.

9. The method of claim 7, wherein the change in the data transfer of the first party is declared by changing a structure of a transmission frame directly to correspond with the data transfer.

10. The method of claim 7, wherein when the manner in which the power control commands are to be sent changes, a size of a power control step of a transmitter is also changed.

11. An apparatus comprising:
   at least one memory including computer program code; and
   at least one processor,
   wherein the at least one memory and the computer program code are configured to, with the at least one processor, cause the apparatus at least to
   identify a change in data transfer of the first party by the second party, wherein either the first party is a base station and the second part is a personal station connected to the base station or the first party is the personal station and the second party is the base station, and in response to the change in the data transfer, change a manner in which the power control commands are to be sent to the first party by the second party to be in accordance with the data transfer, wherein when the data transfer relates to a decreased transmission rate of the first party, the second party is configured to lower an energy of power control commands to be sent to the first party and, correspondingly, when the data transfer relates to an increased transmission rate of the first party, the second party is configured to increase the energy of power control commands.

12. The apparatus of claim 11, wherein the change in the data transfer of the first party is declared in a field of a transmission frame reserved for this purpose.

13. The apparatus of claim 11, wherein the change in the data transfer of the first party is declared by changing a structure of a transmission frame directly to correspond with the data transfer.

14. The apparatus of claim 11, wherein when the manner in which the power control commands are to be sent changes, a size of a power control step of a transmitter is also changed.

15. An apparatus comprising:

identifying means for identifying a change in data transfer of the first party by the second party, wherein either the first party is a base station and the second part is a personal station connected to the base station or the first party is the personal station and the second party is the base station; and changing means for, in response to the change in the data transfer, changing a manner in which the power control commands are to be sent to the first party by the second party to be in accordance with the data transfer, wherein when the data transfer relates to a decreased transmission rate of the first party, the second party is configured to lower an energy of power control commands to be sent to the first party and, correspondingly, when the data transfer relates to an increased transmission rate of the first party, the second party is configured to increase the energy of power control commands.

16. The apparatus of claim 15, wherein the change in the data transfer of the first party is declared in a field of a transmission frame reserved for this purpose.

17. The apparatus of claim 15, wherein the change in the data transfer of the first party is declared by changing a structure of a transmission frame directly to correspond with the data transfer.

18. The apparatus of claim 15, wherein when the manner in which the power control commands are to be sent changes, a size of a power control step of a transmitter is also changed.

19. A computer-readable medium encoded with instruction that, when executed on a computer, perform a process, the process comprising:

identifying a change in data transfer of a first party by the second party, wherein either the first party is a base station and the second part is a personal station connected to the base station or the first party is the personal station and the second party is the base station; and in response to the change in the data transfer, changing a manner in which the power control commands are to be sent to the first party by the second party to be in accordance with the data transfer, wherein when the data transfer relates to a decreased transmission rate of the first party, the second party lowers an energy of power control commands to be sent to the first party and, correspondingly, when the data transfer relates to an increased transmission rate of the first party, the second party increases the energy of power control commands.

20. The computer-readable medium of claim 19, wherein the change in the data transfer of the first party is declared in a field of a transmission frame reserved for this purpose.

21. The computer-readable medium of claim 19, wherein the change in the data transfer of the first party is declared by changing a structure of a transmission frame directly to correspond with the data transfer.

22. The computer-readable medium of claim 19, wherein when the manner in which the power control commands are to be sent changes, a size of a power control step of a transmitter is also changed.

* * * * *

UNITED STATES PATENT AND TRADEMARK OFFICE
CERTIFICATE OF CORRECTION

PATENT NO. : 7,801,545 B2 Page 1 of 1
APPLICATION NO. : 11/025014
DATED : September 21, 2010
INVENTOR(S) : Seppo Hämäläinen et al.

It is certified that error appears in the above-identified patent and that said Letters Patent is hereby corrected as shown below:

On the Title Page insert the following:

item --(30)   Foreign Application Priority Data

January 24, 1997 (FI)..........................................970293--

Signed and Sealed this

Second Day of November, 2010

David J. Kappos
*Director of the United States Patent and Trademark Office*